(12) United States Patent
Rapp

(10) Patent No.: US 6,728,027 B2
(45) Date of Patent: Apr. 27, 2004

(54) BIDIRECTIONAL OPTICAL AMPLIFIER

(75) Inventor: Lutz Rapp, Deisenhofen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/932,569

(22) Filed: Aug. 16, 2001

(65) Prior Publication Data

US 2002/0021166 A1 Feb. 21, 2002

(30) Foreign Application Priority Data

Aug. 16, 2000 (DE) .......................................... 100 39 950

(51) Int. Cl.$^7$ ................................................. H01S 3/00
(52) U.S. Cl. .................................................. 359/341.2
(58) Field of Search .......................... 359/341.2, 341.32

(56) References Cited

U.S. PATENT DOCUMENTS

| | | | |
|---|---|---|---|
| 5,280,549 A | | 1/1994 | Barnard et al. ................ 385/15 |
| 5,548,438 A | * | 8/1996 | Delavaux .................. 359/341.2 |
| 5,604,627 A | * | 2/1997 | Kohn ........................ 359/341.2 |
| 5,652,675 A | * | 7/1997 | Shibuya .................... 359/341.2 |
| 5,742,416 A | * | 4/1998 | Mizrahi ....................... 359/134 |
| 5,875,054 A | * | 2/1999 | Onoda et al. ............. 359/341.2 |
| 6,081,368 A | * | 6/2000 | Delavaux .................. 359/341.2 |
| 6,160,660 A | * | 12/2000 | Aina et al. ................. 359/341.2 |
| 6,310,718 B1 | * | 10/2001 | Saeki ......................... 359/341.2 |
| 6,392,790 B1 | * | 5/2002 | Lauder et al. ............ 359/341.2 |
| 2001/0019449 A1 | * | 9/2001 | Krummrich ............... 359/341.2 |
| 2002/0021489 A1 | * | 2/2002 | Willets et al. ........... 359/341.32 |
| 2002/0141046 A1 | * | 10/2002 | Joo et al. .................. 359/341.2 |

FOREIGN PATENT DOCUMENTS

| | | | |
|---|---|---|---|
| EP | 0 729 248 | 8/1996 | ............. H04J/14/02 |
| JP | 06342950 A | * 12/1994 | ............. H01S/3/10 |

OTHER PUBLICATIONS

Bidirectional Fiber Amplifiers, Barnard et al, pp. 911–913, IEEE Photonics Technology Letters. Aug. 1998.
Erbium–Doped Fiber Amplifiers Principles and Applications, Desurvire, E. pp. 460–469, 1994.
Optische Nachrichtentechnik, Einfuhrung, Grau et al. Feb. 3, 1998 (translated).

* cited by examiner

Primary Examiner—Thomas G. Black
Assistant Examiner—Deandra M. Hughes
(74) Attorney, Agent, or Firm—Bell Boyd & Lloyd LLC

(57) ABSTRACT

An optical amplifier contains two amplifier paths. An optical user signal ($\alpha$, $\beta$) is in each case supplied to an optical amplifier (EDF1, EDF2) through direction separators (RT1, RT2). Each amplifier is followed by a wavelength multiplexer (WDM1, WDM2) via which a pump signal ($\gamma1$, $\gamma2$) is fed in, which, via the direction separator (RT2, RT1) which is connected to its output, pumps the amplifier (EDF2, EDF1) in the other amplifier path in the direction of the user signal ($\alpha$, $\beta$).

7 Claims, 4 Drawing Sheets

BIDIRECTIONAL OPTICAL AMPLIFIER

BACKGROUND OF THE INVENTION

1. Field of the Invention

The invention relates to a bidirectional optical amplifier having a first and second direction separator with a first and second amplifier path and feed devices for inputting pump signals.

2. Description of the Related Art

Optical amplifiers are required for optical transmission systems in which data signals are transmitted bidirectionally via one fiber.

Various bidirectional optical fiber amplifiers are described in "Erbium-Doped Fiber Amplifiers" by Emmanuel Desurvire, Verlag John Wiley & Sons, Inc. NY, 1994, pages 462 to 465. In order to pump a fiber amplifier in the direction of the data signal (FIG. 6.7), the fiber amplifier is preceded by a selective-wavelength coupler. However, this results in the noise response becoming worse due to attenuation of the user signal. In another variant (page 465, FIG. 6.8), pumping is carried out in the opposite direction to the signal direction, which once again fundamentally leads to poorer signal-to-noise ratios since a pump signal which has been attenuated by the amplifier fiber is present at the amplifier input.

SUMMARY OF THE INVENTION

The object of the invention is thus to specify a bidirectional amplifier with an improved signal-to-noise ratio.

This object is achieved by a bidirectional amplifier comprising a first direction separator having a first, second, and third connection, to whose first connection a first fiber section is connected; a second direction separator having a first, second, and third connection, to whose first connection a second fiber section of the transmission fibers is connected; a first fiber amplifier; a second fiber amplifier; a first amplifier path, comprising the first fiber amplifier arranged between the second connection of the first direction separator and the third connection of the second direction separator, the first fiber amplifier amplifying a first optical user signal which is supplied to the first connection of the first direction separator and which is then fed in via the first connection of the second direction separator to the second fiber section; and a first feed device for inputting pump signals that follow the first fiber amplifier, the first feed device having an output that is connected to the third connection of the second direction separator, the second fiber amplifier being pumped in a signal direction via the second direction separator that is connected to the first feed device output, the bidirectional amplifier further comprising a second amplifier path, comprising the second fiber amplifier arranged between the second connection of the second direction separator and the third connection of the first direction separator, the second fiber amplifier amplifying a second optical user signal, which is supplied to the first connection of the second direction separator and is then fed to the first fiber section via the first direction separator; and a second feed device for inputting pump signals that follow the second fiber amplifier, the second feed device having an output that is connected to the third connection of the first direction separator; the first fiber amplifier being pumped in a signal direction via the first direction separator that is connected to the second feed device output; and the second fiber amplifier being pumped in a signal direction via the second direction separator that is connected to the first feed device output.

In this embodiment, the first and second direction separators may be configured as filters such that each respective pump signal, rather than amplified optical user signals, are fed into the second and the first amplifier path respectively. Also, the feed devices may be wavelength multiplexers.

In another embodiment of the invention, the bidirectional amplifier may comprise a first four-port direction separator having a first, second, third, and fourth connection, the first connection being connected to a first fiber section; a second four-port direction separator having a first, second, third, and fourth connection, the first connection being connected to a second fiber section; a first fiber amplifier, which is arranged between the second connection of the first four-port direction separator and the third connection of the second four-port direction separator and amplifies a first optical user signal which is supplied to the first connection of the first four-port direction separator and is then fed via the first connection of the second four-port direction separator to the second fiber section; a second fiber amplifier, which is arranged between the second connection of the second four-port direction separator and the third connection of the first four-port direction separator and amplifies a second optical user signal which is supplied to the first connection of the second four-port direction separator and is then fed via the first connection of the first four-port direction separator to the first fiber section; a first pump signal being fed into the fourth connection of the first four-port direction separator, the first pump signal being coupled to the first fiber amplifier in a direction of the first optical user signal and transmitted in a signal direction; and a second pump signal being fed into the fourth connection of the second four-port direction separator, the second pump signal being coupled to the second fiber amplifier in a direction of the second optical user signal and transmitted in a signal direction.

In this other embodiment, the first and second four-port direction separators may be based on beam splitter principles and the pump signals in each case pump the respective fiber amplifiers in a direction of each respective optical data signal. In either embodiment, the fiber amplifiers may also be pumped in an opposite direction to a transmission direction of respective optical user signals.

An improvement in the noise response is achieved if the optical user signal and pump signal are propagated in the same direction and there are no feed devices for the respective pump signal to cause additional attenuation of the input user signals to the fiber amplifiers.

BRIEF DESCRIPTION OF THE DRAWINGS

Exemplary embodiments are explained in more detail with reference to figures, in which.

DETAILED DESCRIPTION OF THE INVENTION

Figure 1:
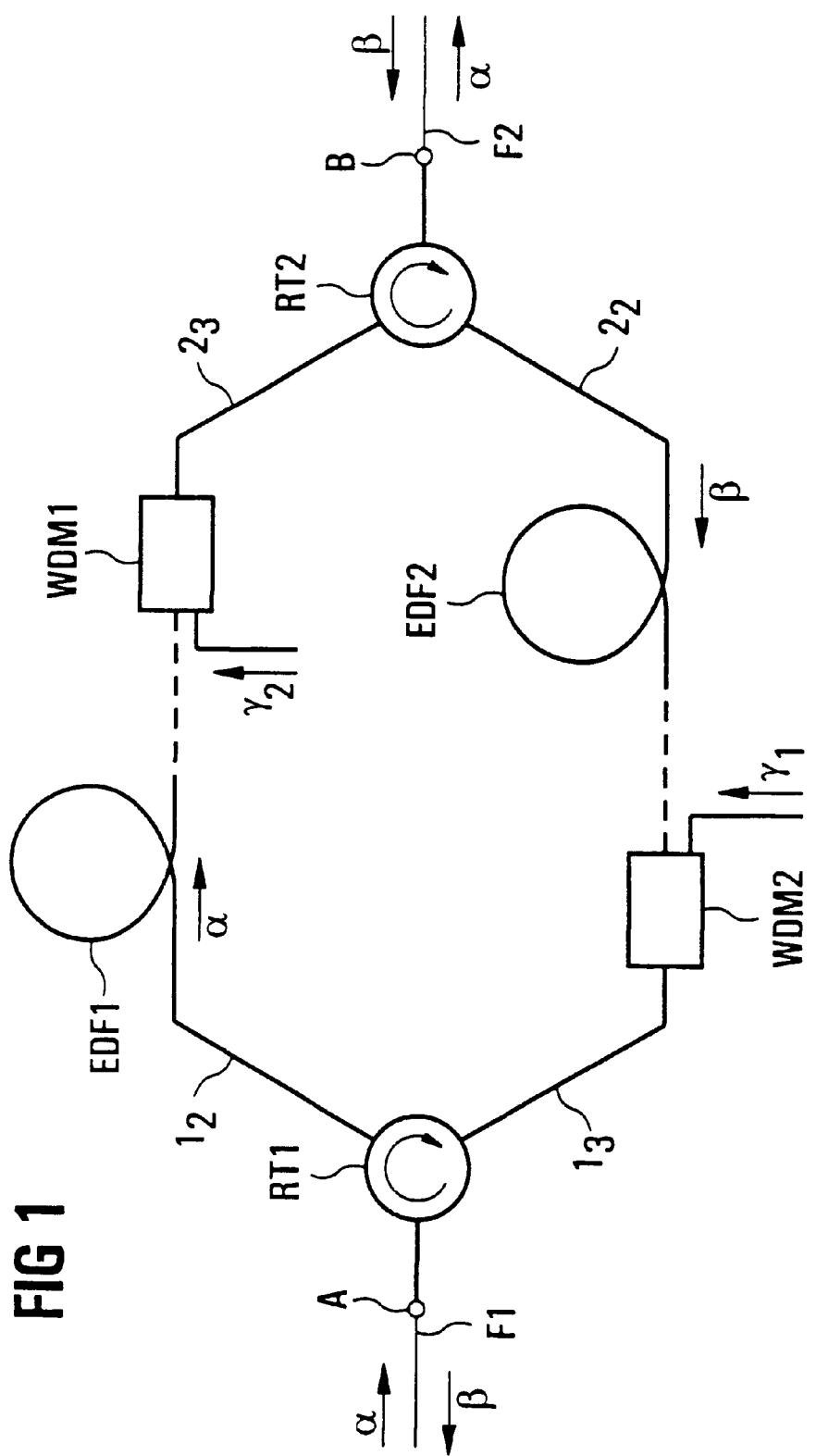
FIG. 1 is a schematic circuit diagram of a bidirectional amplifier with an optical direction separator.

The bidirectional amplifier illustrated in FIG. 1 has two connections A and B. A first fiber section F1 of the transmission fiber is connected to the first connection A, and a second section F2 is connected to the second connection B. The connection A corresponds to a first connection of a first direction separator RT1, which is in the form of a three-port device. This connection is fed with a first optical user signal α, which is emitted at the second connection 12 and is amplified in a first amplifier path, which comprises a first fiber amplifier EDF1 with a downstream wavelength multiplexer (feed device) WDM1.

The amplified user signal is supplied to a connection 23 of a second direction separator RT2, and is emitted via its first connection B. A second optical signal β is fed in via this connection, is supplied at the second connection 22 of the direction separator RT2 to the series circuit comprising a second fiber amplifier EDF2 and a second wavelength multiplex WDM2, and is emitted via a third connection 13 of the first direction separator RT1 at the connection A.

Filter arrangements are used as direction separators. Reflection filters may be used, provided different wavelength bands are used for the two transmission directions. The pump signals γ1 and γ2, which may originate from one or more sources, are fed in via the wavelength multiplexers. The first pump signal γ1 is fed in via the second wavelength multiplexer WDM2, and the first direction separator RT1 in the same direction as the transmission direction of the optical signal α. In this arrangement, the optical signal α does not have to pass through any wavelength multiplexers, so that the user signal is not attenuated by such multiplexers, and the signal-to-noise ratio does not become poorer. In the same way, the second fiber amplifier EDF2 is pumped by the pump signal γ2 via the first wavelength multiplexer WDM1 and the second direction separator RT2. If the direction separators are compared with circulators, then they have a different direction sense for the pump signal than for the user signals. In principle, optical couplers may also be used instead of the wavelength multiplexers, but they have greater attenuation.

Figure 2:
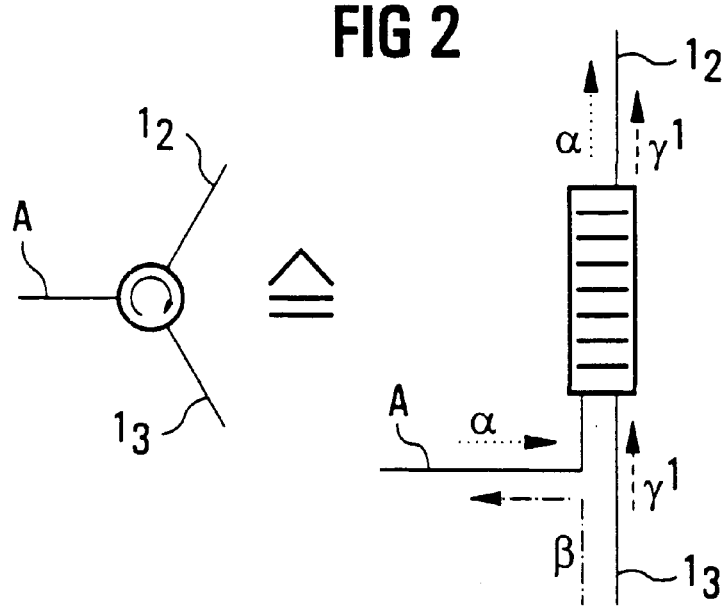
FIG. 2 is a schematic diagram showing the construction of a first direction separator.

FIG. 2 shows the fundamental design of the first direction separator RT1 as a reflection filter. The optical signal α applied to connection A is not reflected, but is emitted at the output 12. In contrast, the user signal β supplied to the connection 13 is reflected by the reflection filter and is emitted at the connection A, while the pump signal γ1 is not reflected, it is emitted together with the optical user signal at the connection 12, and is supplied to the fiber amplifier EDF1.

Figure 3:
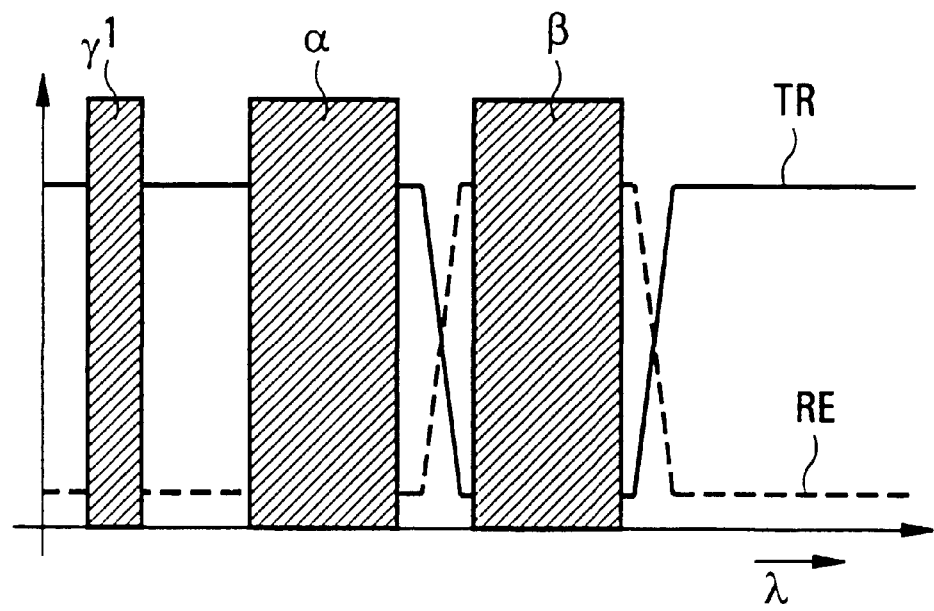
FIG. 3 is a graph showing the pass bands and cut-off bands of this direction separator.

FIG. 3 shows the transfer function of the filter as a function of the wavelength λ. For illustrative purposes, the attenuation or reflection (RE) is shown in addition to the transfer function TR (transmission). The signals α, β and γ1 are represented in the form of bars.

Figure 4:
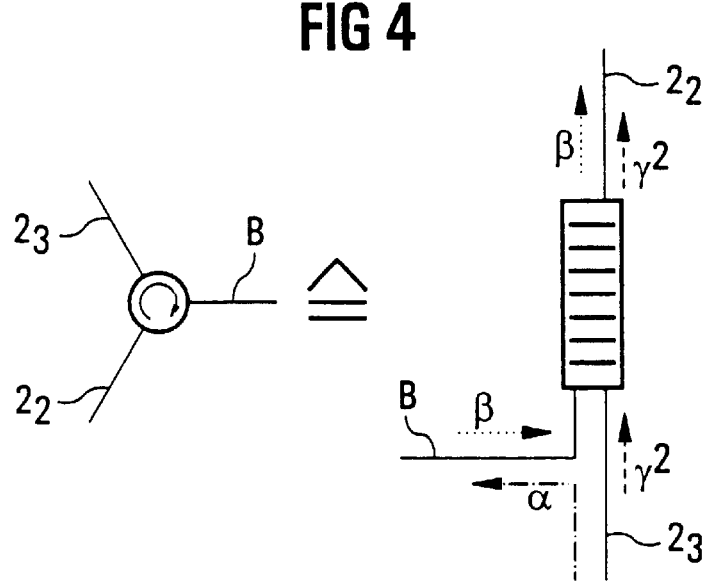
FIG. 4 is a schematic diagram showing the construction of a second direction separator.
Figure 5:
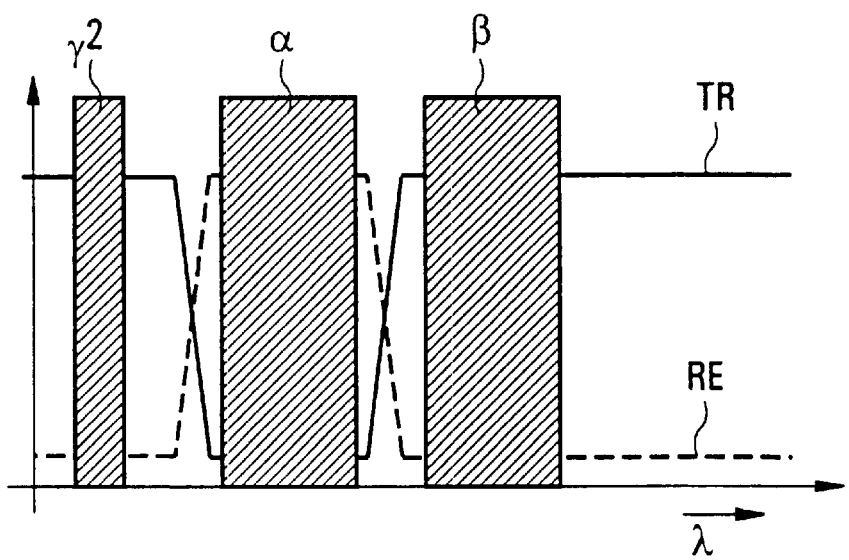
FIG. 5 is a graph showing the pass bands and cut-off bands of this direction separator.

FIG. 4 shows the fundamental design of the second direction separator RT2 as a reflection filter, and FIG. 5 shows the associated transfer function.

Figure 6:
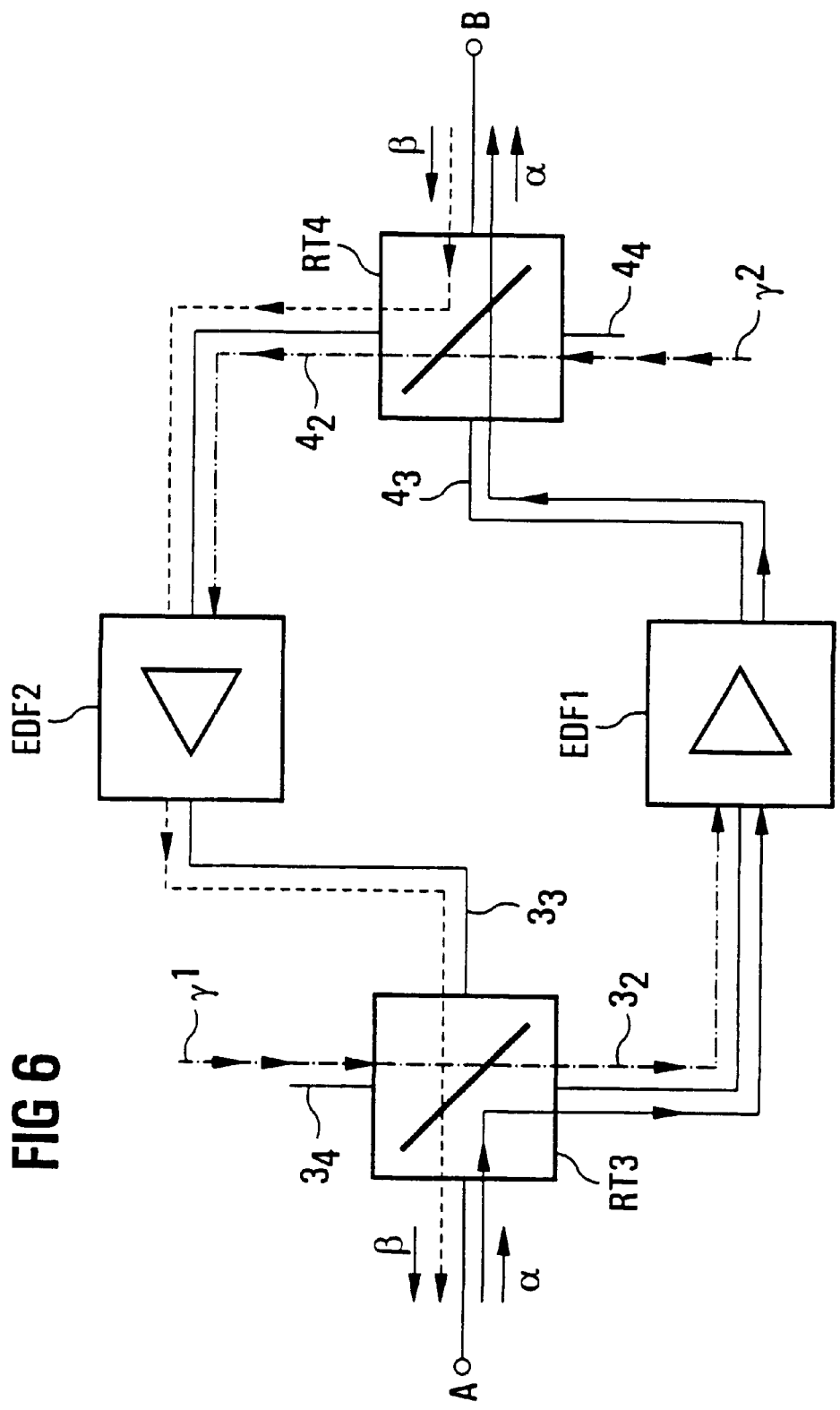
FIG. 6 is a schematic circuit diagrams of a variant of a bipolar amplifier.

FIG. 6 shows a variant of the bidirectional amplifier, which does not contain any wavelength multiplexers in the signal path. Four-port direction separators RT3 and RT4 are used instead of the selected-wavelength direction separators in the form of three-port devices. The optical user signals α, β are passed on in the illustrated manner from the four-port direction separators, as in the exemplary embodiment in FIG. 1, without any major attenuation.

Each four-port direction separator has a fourth connection 34 or 44, respectively. The amplifiers EDF1 and EDF2 can be pumped via these connections without any additional feed devices (wavelength multiplexers) being required in the signal path for this purpose. This avoids any attenuation losses in the user signals. The four-port directional couplers may, for example, operate on the beam splitter principle. This principle is known from "Optisch Nachrichtentechnik—eine Einführung" [Optical information technology—an introduction] by G. Grau, W. Freude, 3rd Edition, pages 282 and 283.

Elements that are required for circuitry reasons, such as optical isolators and so on, are not shown in the outline circuit diagram. In multi-stage amplifiers, at least the first amplifier stage should also be pumped in the direction of the optical user signal.

The above-described bidirectional amplifiers are illustrative of the principles of the present invention. Numerous modifications and adaptations will be readily apparent to those skilled in this art without departing from the spirit and scope of the present invention.

What is claimed is:

1. A bidirectional amplifier, comprising:
   a first direction separator having a first, second, and third connection, to whose first connection a first fiber section is connected;
   a second direction separator having a first, second, and third connection, to whose first connection a second fiber section of the transmission fibers is connected;
   a first fiber amplifier;
   a second fiber amplifier;
   a first amplifier path, comprising:
      said first fiber amplifier arranged between said second connection of said first direction separator and said third connection of said second direction separator, said first fiber amplifier amplifying a first optical user signal which is supplied to said first connection of the first direction separator and which is then fed in via said first connection of said second direction separator to said second fiber section; and
      a first feed device, for inputting pump signals, that follows said first fiber amplifier, said first feed device having an output that is connected to said third connection of said second direction separator, said second fiber amplifier being pumped in a signal direction via said second direction separator that is connected to said first feed device output;
   said bidirectional amplifier further comprising:
   a second amplifier path, comprising:
      said second fiber amplifier arranged between said second connection of said second direction separator and said third connection of said first direction separator, said second fiber amplifier amplifying a second optical user signal, which is supplied to said first connection of said second direction separator and is then fed to said first fiber section via said first direction separator; and
      a second feed device, for inputting pump signals, that follows said second fiber amplifier, said second feed device having an output that is connected to said third connection of said first direction separator;
   said first fiber amplifier being pumped in a signal direction via said first direction separator that is connected to said second feed device output; and
   said second fiber amplifier being pumped in a signal direction via said second direction separator that is connected to said first feed device output.

2. The bidirectional amplifier as claimed in claim 1, wherein said first and second direction separators are configured as filters such that each respective pump signal, rather than amplified optical user signals, are fed into said second and said first amplifier path respectively.

3. The bidirectional amplifier as claimed in claim 1, wherein said feed devices are wavelength multiplexers.

4. A bidirectional amplifier, comprising:

a first four-port direction separator having a first, second, third, and fourth connection, said first connection being connected to a first fiber section;

a second four-port direction separator having a first, second, third, and fourth connection, said first connection being connected to a second fiber section;

a first fiber amplifier, which is arranged between said second connection of said first four-port direction separator and said third connection of said four-port direction separator and amplifies a first optical user signal which is supplied to said first connection of said first four-port direction separator and is then fed via said first connection of said second four-port direction separator to said second fiber section;

a second fiber amplifier, which is arranged between said second connection of said second four-port direction separator and said third connection of said first four-port direction separator and amplifies a second optical user signal which is supplied to said first connection of said second-four-port direction separator and is then fed via said first connection of said first four-port direction separator to said first fiber section;

a first pump signal being fed into said fourth connection of said first four-port direction separator, said first pump signal being coupled to said first fiber amplifier in a direction of said first optical user signal and transmitted in a signal direction; and a second pump signal being fed into said fourth connection of said second four-port direction separator, said second pump signal being coupled to said second fiber amplifier in a direction of said second optical user signal and transmitted in a signal direction.

5. The bidirectional amplifier as claimed in claim 4, wherein said first and second four-port direction separators are based on beam splitter principle and said pump signals in each case pump said respective fiber amplifiers in a direction of each respective optical data signal.

6. The bidirectional amplifier as claimed in claim 1, wherein said fiber amplifiers are also pumped in an opposite direction to a transmission direction of respective optical user signals.

7. A bidirectional amplifier as claimed in claim 1, wherein said first feed device is arranged downstream from said first fiber amplifier and wherein said second feed device is arranged downstream from said second fiber amplifier, such that the first optical user signal to be amplified by the first fiber amplifier is not distorted by the first feed device and the second optical user signal to be amplified by the second fiber amplifier is not distorted by the second feed device.

* * * * *